March 24, 1936.  H. ROBINSON, JR  2,034,834
SPARE TIRE OR WHEEL CARRIER
Filed March 28, 1934  3 Sheets-Sheet 1

Inventor:—
Hanson Robinson Jr.
by his Attorneys
Howson & Howson

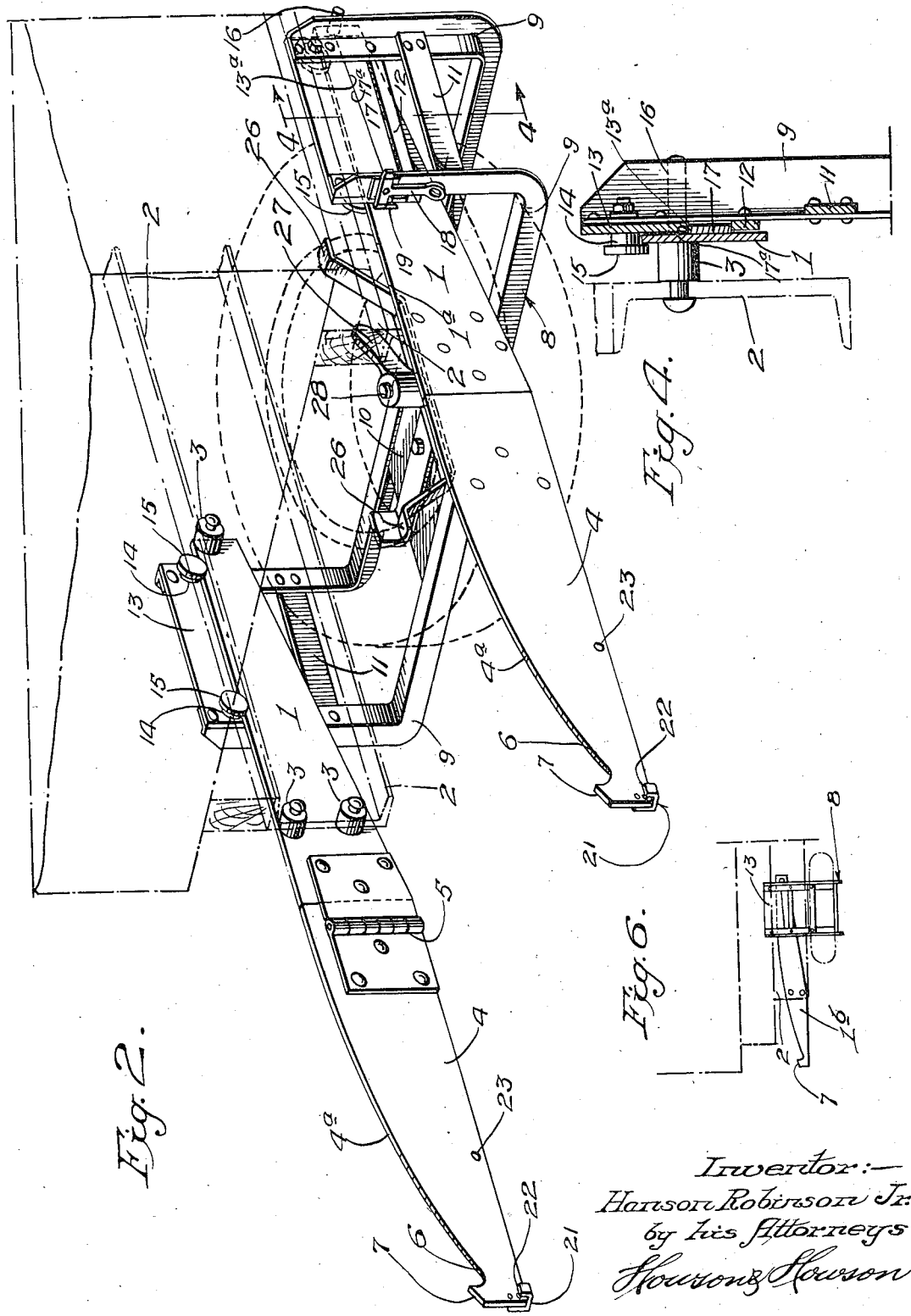

March 24, 1936.   H. ROBINSON, JR   2,034,834
SPARE TIRE OR WHEEL CARRIER
Filed March 28, 1934    3 Sheets-Sheet 3
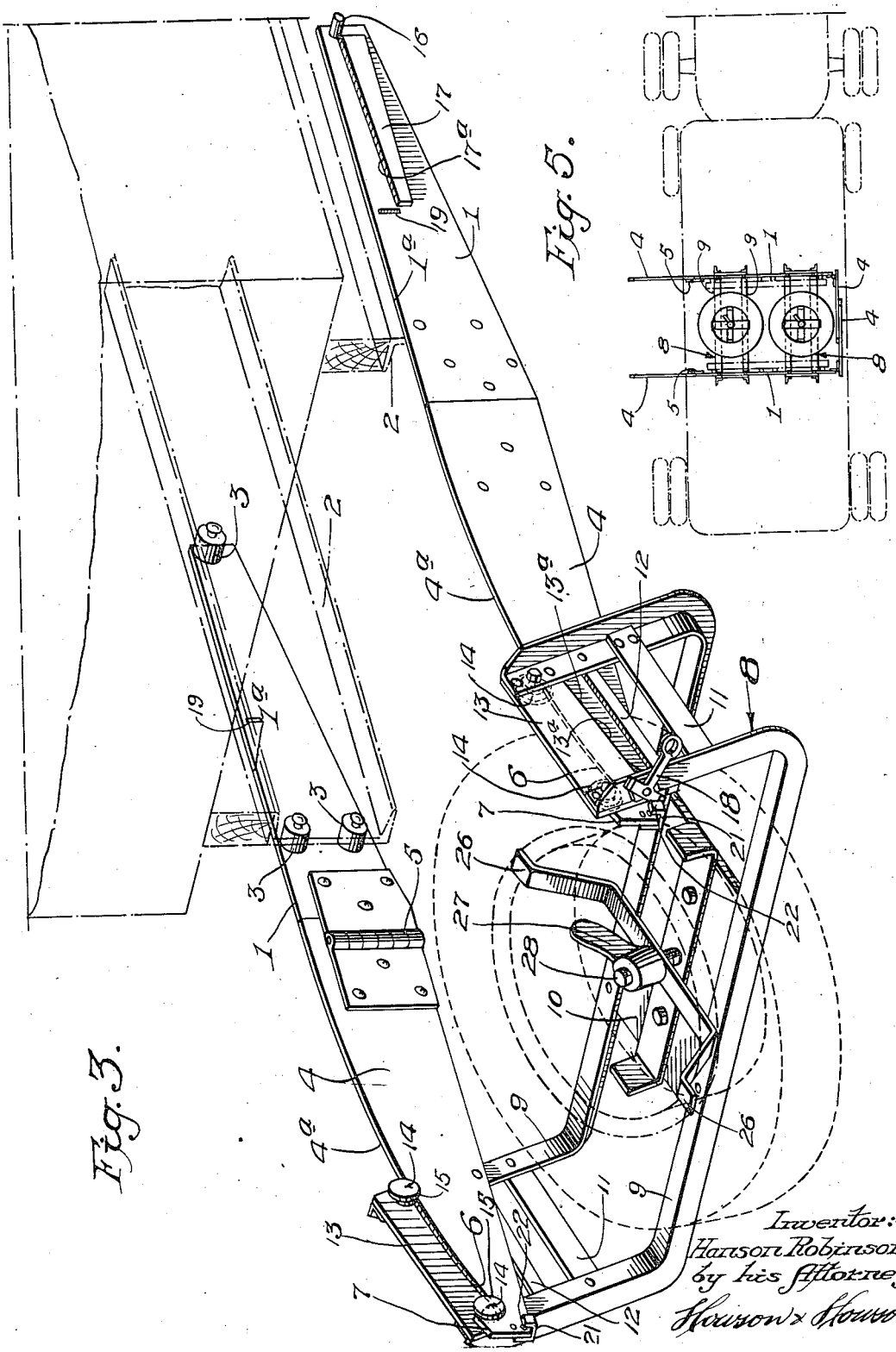

Patented Mar. 24, 1936

2,034,834

UNITED STATES PATENT OFFICE 2,034,834

SPARE TIRE OR WHEEL CARRIER

Hanson Robinson, Jr., Wayne, Pa., assignor to Wayne Iron Works, Wayne, Pa., a corporation of Pennsylvania Application March 28, 1934, Serial No. 717,864

17 Claims. (Cl. 224—29)

This invention relates to new and useful improvements in devices for carrying spare wheels and/or tires on road vehicles and more particularly has reference to devices for use with trucks or other vehicles using relatively heavy giant tires.

The principal object of the invention is to provide a device of the character set forth by which a spare wheel and/or tire may be compactly stored in an elevated position beneath the body of a vehicle and yet rendered conveniently accessible for removal from and replacement thereon of a wheel and/or tire with the utmost ease and dispatch.

A further object of the invention is to provide a carrier device of the character set forth which is movably mounted beneath the body of a vehicle in such manner as to render the same capable of being manipulated to an elevated retracted position beneath the body of the vehicle for storage and carriage and to a lowered projected position sufficiently beyond the vehicle body as to be conveniently accessible for removal of a wheel or tire therefrom.

A further object of the invention is to provide a carrier device of the character set forth, which may be securely locked against theft in its retracted position beneath the vehicle.

Other features and objects of the invention and the details of construction thereof will be set forth hereinafter and are set forth in the accompanying drawings, in which:

Fig. 2 is a view in perspective similar to the disclosure in Fig. 1 showing the device unlocked and open for use.

Fig. 3 is a view in perspective of a disclosure similar to that shown in Fig. 2 showing the tire carrier in its lowered projected position beyond the end of the truck body.

Fig. 4 is a view in section on line 4—4, Fig. 2;

Fig. 5 is a diagrammatic plan view showing an alternative arrangement of the subject matter of this invention with respect to a truck body or trailer; and Fig. 6 is a diagrammatic view in elevation of a modification of the invention.

Figure 1:
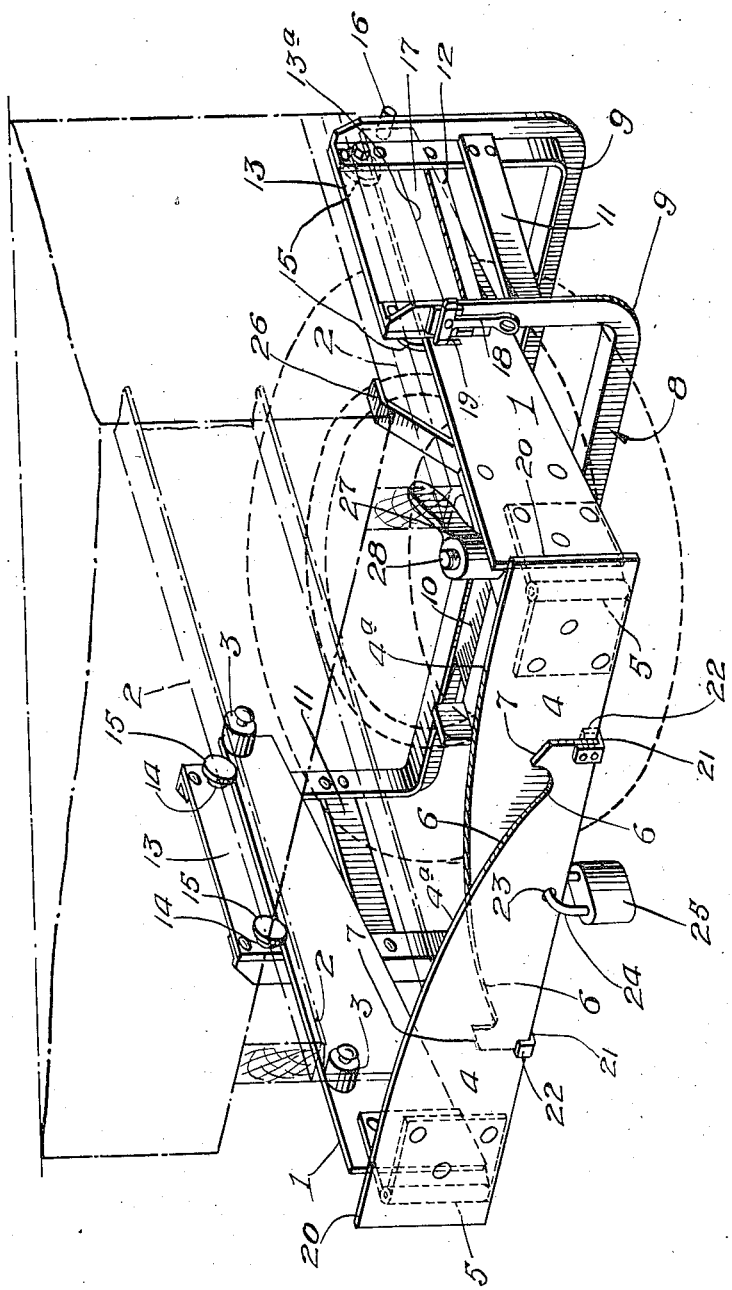
Fig. 1 is a view in perspective of the device mounted beneath a truck body upon the frame structure thereof showing the same locked in retracted or carrying position.

Referring now more particularly to the drawings, reference numeral 1 designates a runner member which is secured to the outer side of the web of each of the customary longitudinal frame members 2 of a vehicle frame, the said runners 1 in each instance being spaced from the adjacent surface of the web of said channel members 2 by means of collars or washers 3.

An extension runner 4 is pivotally connected to the rearward extremity of each of the runners 1 by means of hinges 5, and in the present instance the upper edges 4a of said hinged extensions 4 constituting the runner surface, decline or slope downwardly as at 6 in a direction away from the hinged end thereof at which point the upper edge 4a is substantially co-planar with the upper horizontal edge 1a of the fixed runner members 1. An upstanding projection 7 is formed at the outer extremity of the extension runners 4 for a purpose which will be described more in detail hereinafter.

In the present instance, a carriage designated generally as 8, and arranged to ride upon the upper edges 1a and 4a respectively of the runners 1 and their hinged extensions 4, comprises a pair of spaced substantially U-shaped members 9 which are connected together at their bottom portions by means of a plate 10, and intermediate their vertical or side portions by means of struts 11 and 12. A plate 13 is secured between the corresponding extremities of each of the members 9.

The carriage 8 is suspended from the runners 1 and 4 by means of rollers 14 which are rotatably mounted on the adjacent faces of the plates 13, said rollers being arranged to ride upon the upper edges 1a and 4a respectively of the runners 1 and 4. The rollers 14 are provided with a radially projecting flange 15 arranged to overlie the inner face of each of the runners and extensions to prevent displacement of said rollers 14 laterally from the upper edges thereof. A pin 16 projects outwardly from each of the runners 1 adjacent the inner or forward end thereof for the purpose of limiting movement of the carriage beyond the ends of said runners.

A wedge member 17 is secured to the outer face of each of the fixed runner members 1 and has its upper edge 17a inclined at a small angle toward the inner or forward end of said runners. Similarly the lower edge 13a of the plates 13 connecting the tops of each of the members 9 is similarly inclined at an angle with respect to the horizontal equal to the inclination of the upper edge 17a of the wedge 17, so that when the carriage 8 is in the position shown in Figs. 1 and 2 at the extreme inner extent of the fixed runners 1 and abutting the stop pin 16, the lower edge surface 13a of the plate 13 will ride up the inclined upper edge 17a of the wedge 17 to elevate the carriage and raise the rollers 14 out of contact with the upper edge 1a of the fixed runners 1, thus preventing the carriage 8 from moving back and forth upon the said runners when in storage position. The strut 12 engages the under edge of the wedge 17 to maintain the carriage firmly seated on the edge 17a and eliminate bouncing and rattling thereof.

For the purpose of more firmly securing the carriage 8 in its retracted or storage position, a latch 18 is pivotally mounted upon the vertical arm portions of the outer or rearward member 9 and is arranged when in the position shown in Figs. 1 and 2 to engage a vertical slot 19 formed in the runners 1 and lock said carriage 8 against any possible movement along the said runners.

It will be noticed by referring to Figs. 2 and 3 that the axes of the hinges 5 connecting the extension runners 4 to the runners 1 are offset rearwardly or outwardly beyond the line of abutment of said runners rather than in alignment therewith as is customary. This arrangement of the hinges 5 permits the rear or inner extremity of said extension runners 4 to project laterally beyond the outer face of each of the fixed runners 1 when the extension runners 4 are folded inwardly in overlapping relation, as indicated at 20 in Fig. 1.

This arrangement provides an effective abutment or obstruction in the path of the carriage 8 should the operator of the vehicle or other person fail to engage the latch 18 in the slot 19 and in the further event that the said carriage is jarred or otherwise displaced from the inclined wedge contact existing between plates 13 and the wedges 17.

In the present instance an element 21 is secured to the lower extreme end of the hinged extension runners 4 and this element 21 is provided with an up-turned portion 22 spaced from the adjacent face of said runners as shown in Fig. 2 for the purpose of engaging the lower edge of the other extension runner 4 when in folded or overlapping position shown in Fig. 1 to prevent relative movement of said extension runners 4 with respect to each other when not in use. The lower edges of the extension runners 4 may be easily sprung into engagement with the elements 21 and released from engagement as desired. Apertures 23 are formed in each of the extension runners 4 adjacent the lower edges thereof and are so positioned that when the said runners are folded in overlapping relation as shown in Fig. 1, said apertures will coincide and provide a suitable opening for the passage of the closure member 24 of an ordinary padlock 25.

In the present instance the carriage 8 is of sufficient width to support a giant tire and/or wheel horizontally thereon. Any desired form of locking device may be provided for securing the tire and/or wheel to the carriage and in the present instance the customary upwardly diverging arms 26 for gripping the tire rim are shown together with a wing nut 27 on a screw 28 for tightening the arm 26 to firmly hold the tire and/or wheel on the carriage.

Fig. 5 of the drawings shows a modified arrangement of the invention wherein two of the devices are mounted in alignment transversely of the body of the vehicle or trailer and arranged to open respectively on either side thereof. In this manner two spare tires and/or wheels may be carried.

In operation, normally the carriage resides in its retracted position beneath the body of the vehicle and the extension runners 4 are locked in overlapping closed relation as shown in Fig. 1. In this position the rollers 14 are out of contact with the runners 1 and the latch 18 should be in engagement with the slot 19 to preclude shifting of the carriage 8 along the runners 1.

When it is desired to remove or replace a tire assembly on the carriage the hinged extensions should be unlocked and pivoted to the position shown in Fig. 2 co-planar with the runners 1. Upon releasing the latch 18 from engagement with slot 19 the carriage 8 may be readily rolled on the runners 1 and 4 to the lowered projected position shown in Fig. 3 beyond the truck body where it is retained by means of the projection 7 and from which position the removal or replacement of a tire and the handling thereof is greatly facilitated. When removal or replacement has been accomplished the carriage 8 may be easily rolled to and locked in its retracted position beneath the vehicle body, and the extension runners 1 folded and locked in the relation shown in Fig. 1 of the drawings.

A further modification of the invention is shown in Fig. 6 of the drawings wherein runners 1b fixedly secured to the under-frame structure of a vehicle including the downwardly sloping extended portion thereof, are continuous integral elements, not pivotally connected at their approximate mid points as in the disclosures of Figs. 1, 2 and 3, of the drawings. This form of installation of the device may be used for example, in instances where the body of the vehicle overlies the rear end of the frame members at a substantial distance thereabove, as is common in some of the larger interstate motor freight vehicles. The carriage 8 and any and all other operations of the device function in the same manner as hereinbefore described.

It is pointed out that while the invention has been described for use in carrying spare tires, wheels and the like, it will be obvious that the apparatus may be employed with equal efficiency in the carriage of any other articles including trunks, suit cases, and the like. So too, it is not intended that the construction of the device be limited to the specific details set forth herein for the purposes of description but that changes and modifications may be made thereto within the scope of the annexed claims.

What I claim is:

1. In a device of the character described, the combination with a supporting structure, of runners mounted thereon, a carriage having rollers supported on said runners and arranged to travel thereon between an inner retracted position and a projected position, and means on the runners arranged to cooperate with means on said carriage in its retracted position to raise the same and lift the rollers out of contact with said runners.

2. In a device of the character described, the combination with a supporting structure, of runners mounted thereon and having a portion of their runner edges sloping away from said vehicle, and a carriage supported on said runners and arranged to travel thereon between an elevated retracted position and a lowered projected position.

3. In a device of the character described, the combination with a supporting structure, of runners mounted thereon and having a portion of their runner edges sloping away from said vehicle, a carriage supported on said runners and arranged to travel thereon between an elevated retracted position and a lowered projected position, and means for locking the carriage in said retracted position.

4. In a device of the character described, the combination with a supporting structure, of runners mounted thereon and having a portion of their runner edge sloping away from said vehicle, a carriage having rollers supported from said runners and arranged to travel thereon between an inner elevated retracted position and a lowered projected position, and means on the runners arranged to cooperate with means on said carriage in its elevated retracted position to raise the same and lift the rollers out of contact with said runners.

5. In a device of the character described, the combination with a supporting structure, of runners fixedly secured thereto in spaced parallel relation, extension runners hingedly connected to the extremities of said fixed runners and pivotable from positions at right angles to the fixed runners to positions in alignment therewith, said extension runners having their runner edge sloping downwardly away from the fixed runners, and a carriage arranged to travel on said runners when in alignment between an inner elevated retracted position and a lowered projected position.

6. In a device of the character described, the combination with a supporting structure, of runners fixedly secured thereto in spaced parallel relation, extension runners hingedly connected to the extremities of said fixed runners and pivotable from positions at right angles to the fixed runners to positions in alignment therewith, said extension runners having their runner edge sloping downwardly away from the fixed runners, a carriage arranged to travel on said runners when in alignment between an inner elevated retracted position and a lowered projected position, and means for locking the carriage in said retracted position.

7. In a device of the character described, the combination with a supporting structure, of runners fixedly secured thereto in spaced parallel relation, extension runners hingedly connected to the extremities of said fixed runners and pivotable from positions at right-angles to the fixed runners to positions in alignment therewith, said extension runners having their edge extending downwardly away from the fixed runners, a carriage arranged to travel on said runners when in alignment between an inner elevated retracted position and a lowered projected position, and means operable to engage the carriage in its retracted position and lift the rollers out of contact with the runners.

8. In a device of the character described, the combination with a supporting structure, of runners fixedly secured thereto in spaced parallel relation, extension runners hingedly connected to the extremities of said fixed runners and pivotable from positions at right-angles to the fixed runners to positions in alignment therewith, said extension runners having their edge extending downwardly away from the fixed runners, a carriage having rollers arranged to travel on said runners when in alignment between an inner elevated retracted position and a lowered projected position, and means on each of the fixed runners arranged to cooperate with means on said carriage in its elevated retracted position to raise the same and lift the rollers out of contact with said runners.

9. In a device of the character described, the combination with a supporting structure, of runners fixedly secured thereto in spaced parallel relation, extension runners hingedly connected to the extremities of said fixed runners and pivotable from overlapping relation at right-angles to the fixed runners to positions in alignment therewith, said extension runners having their edge extending downwardly away from the fixed runners, a carriage arranged to travel on said runners when in alignment between an inner elevated retracted position and a lowered projected position, and means at the end of each of the extension runners arranged to engage the other of said runners when in overlapping relation.

10. In a device of the character described, the combination with a supporting structure, of runners fixedly secured thereto in spaced parallel relation, extension runners hingedly connected to the extremities of said fixed runners and pivotable from overlapping relation at right-angles to the fixed runners to positions of alignment therewith, a carriage having rollers supported by said runners and arranged to travel on said runners when in alignment between an inner elevated retracted position and a lowered projected position, means on the fixed runners arranged to cooperate with means on said carriage in its retracted position to raise the same and lift the rollers out of contact with said runners, means for locking the carriage in said retracted position, and means at the end of each of the extension runners arranged to engage the other of said runners when in overlapping relation to prevent pivoting thereof.

11. In a device of the character described, the combination with a supporting structure, of runners fixedly secured thereto in spaced parallel relation, extension runners hingedly connected to the extremities of said fixed runners and constructed and arranged so that the same will overlap when in a position at right angles to the fixed runners, and means mounted at the end of each of the extension runners arranged to engage the other of said runners when in overlapping relation to prevent pivoting thereof.

12. In a device of the character described, the combination with a supporting structure, of runners mounted thereon, a carriage supported on said runners and arranged to travel thereon between an inner retracted position and a projected position, and means on the runners arranged to cooperate with means on said carriage in its retracted position to raise the same from contact with said runners.

13. In a device of the character described, the combination with a supporting structure, of runners mounted thereon and having a portion of their runner edge depending from said vehicle, a carriage supported from said runners and arranged to travel thereon between an inner elevated retracted position and a lowered projected position, and means operable to engage the carriage in its retracted position and lift the same from contact with said runners.

14. In a device of the character described, the combination with a supporting structure, of runners fixedly secured thereto in spaced parallel relation, extension runners hingedly connected to the extremities of said fixed runners and pivotable from positions at right-angles to the fixed runners to positions in alignment therewith, a carriage arranged to travel on said runners when in alignment between an inner retracted position and a projected position, and means on each of the fixed runners arranged to cooperate with means on said carriage in its retracted position to raise the same from contact with said runners.

15. In a device of the character described, the combination with a supporting structure, of runners fixedly secured thereto in spaced parallel relation, extension runners hingedly connected to the extremities of said fixed runners and pivotable from positions at right-angles to the fixed runners to positions in alignment therewith, a carriage arranged to travel on said runners when in alignment between an inner retracted position and a projected position, and means operable to engage the carriage in its retracted position and lift the same from contact with the runners.

16. In a device of the character described, the combination with a supporting structure, of runners mounted thereon, a carriage supported on said runners and arranged to travel thereon between an inner retracted position and a projected position, and means operable to engage the carriage in its retracted position and lift the same from contact with the runners.

17. In a device of the character described, the combination with a supporting structure of runners fixedly secured thereto in spaced parallel relation, extension runners hingedly connected to the extremities of said fixed runners and pivotable from positions at right-angles to the fixed runners to positions in alignment therewith, said extension runners having their upper edge extending downwardly away from said fixed runners.

HANSON ROBINSON, Jr.